(12) United States Patent
Ikegami (10) Patent No.: US 7,195,618 B2
(45) Date of Patent: Mar. 27, 2007

(54) DIAPER FOR MALE PET

(75) Inventor: Takeshi Ikegami, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

(21) Appl. No.: 10/995,027

(22) Filed: Nov. 23, 2004

(65) Prior Publication Data

US 2005/0154367 A1    Jul. 14, 2005

(30) Foreign Application Priority Data

Nov. 25, 2003    (JP)    ............................. 2003-394762

(51) Int. Cl.
*A61F 5/44*    (2006.01)
(52) U.S. Cl. .................. 604/351; 604/345; 604/346; 604/353
(58) Field of Classification Search ................ 604/351, 604/346, 345, 349, 353, 356
See application file for complete search history.

(56) References Cited

U.S. PATENT DOCUMENTS

| | | | | |
|---|---|---|---|---|
| 1,188,223 | A | * | 6/1916 | Uyeda .......................... 604/394 |
| 4,577,591 | A | * | 3/1986 | Wesseldine .................. 604/391 |
| 4,996,949 | A | | 3/1991 | Wunderman |
| 5,005,525 | A | * | 4/1991 | Stanton .................. 604/385.14 |
| 5,226,386 | A | * | 7/1993 | Thoma ......................... 119/869 |
| 5,662,640 | A | * | 9/1997 | Daniels ....................... 604/392 |
| 6,368,313 | B1 | * | 4/2002 | Howard .................. 604/385.09 |
| 6,651,649 | B2 | * | 11/2003 | Spencer ..................... 128/95.1 |
| 2006/0217678 | A1 | * | 9/2006 | Ikegami et al. ............. 604/386 |

FOREIGN PATENT DOCUMENTS

| | | |
|---|---|---|
| JP | 07-236380 | 9/1995 |
| JP | 10-052187 | 2/1998 |
| JP | 2003-047360 | 2/2003 |
| JP | 2003-088262 | 3/2003 |
| JP | 2003-102313 | 4/2003 |
| JP | 2003-210062 | 7/2003 |
| JP | 2003-220090 | 8/2003 |

* cited by examiner

*Primary Examiner*—Tatyana Zalukaeva
*Assistant Examiner*—Ginger Chapman
(74) *Attorney, Agent, or Firm*—Morrison & Foerster LLP (57) ABSTRACT

The present invention provides a diaper for a male pet which is not displaced even when the diaper is fitted on a male pet for a long time and can cover a urethral opening of the male pet and can surely capture urine or the like. A diaper for a male pet which is put on a male pet and includes a diaper body having a back pad portion which is brought into contact with the vicinity of a back of the male pet, a crotch pad portion which is brought into contact with the vicinity of a crotch of the male pet, and a belly pad portion which is brought into contact with the vicinity of a belly of the male pet, wherein the diaper for a male pet further includes a urine capture member which has a urine capture region which is arranged at a position and is set to a size to allow to cover a urethral opening of the male pet and the vicinity of the urethral opening when the diaper for a male pet is put on the male pet and includes a urine absorbing body which absorbs urine, and a holding structure which holds the diaper such that the urine capture region is brought into contact with the belly of the male pet even after the urine absorbing body absorbs urine.

16 Claims, 7 Drawing Sheets

DIAPER FOR MALE PET

CROSS-REFERENCE TO RELATED APPLICATIONS

This application is based upon and claims the benefit of priority from Japanese Patent application No. 2003-394762 filed on Nov. 25, 2003, the entire contents of which is incorporated herein by reference.

FIELD OF THE INVENTION

The present invention relates to a diaper for a pet which is optimum for a male pet.

RELATED ART

Dogs and cats have been kept as pets since olden times. Recently, along with the increase of high-rise apartment building such as condominiums which have no gardens, these pets are popularly kept indoors. To keep the pet indoors, what an owner of the pet feels the most difficulty in keeping the pet is how to discipline the pet so that the pet can evacuate at a given spot by himself/herself. Although it is possible to impose such a discipline on an adult dog, there has been a problem that it is difficult to impose such a discipline to a baby dog whose age is only a few months or so after it was born or a young dog whose age is less than one year. Further, even with respect to the adult dog, due to aging or an accident, the owner must help the dog to evacuate the bowels. In such a case, there exists the possibility that the dog evacuates the bowels when the owner cannot take care of the dog and hence, the residence of the owner is smeared with feces and urine.

Under such circumstances, various kinds of diapers for a pet have been commercialized. Among these diapers for a pet, for example, as disclosed in Japanese Unexamined Patent Publication Hei7(1995)-236380 (patent literature 1), there has been known a diaper for a pet which is constituted of a top sheet which is formed of liquid-permeable non-woven fabric or the like, a back sheet which is formed of a liquid-impermeable plastic film, and an absorbent body which is sandwiched by the top sheet and the back sheet and absorbs liquid which permeates the top sheet. Further, an opening having a given shape and size is formed at a position corresponding to a tail of the pet so as to allow the tail of the pet to project to the outside through the opening.

However, this such diaper for a pet has the structure based on a diaper for human and there is no difference between male-use and female-use whereby the diaper for a pet has the structure that a length of the diaper is shorter than a length of the trunk portion of the pet. However, different from human, with respect to the pet which is a four-legged walking animal, a position of urethral opening largely differs between the male and the female. Particularly, with respect to a type of dog having short legs and an elongated trunk such as a dachshund (including a miniaturized dachshund), the urethral opening of the male dog is present at a center portion of the trunk. Further, this type of long-trunk and short-legged dog is liable to easily suffer from a waist pain due to aging from a viewpoint of skeletal structure and cannot move, and diapers tend to be needed.

However, with respect to the commercially available diaper for a pet, in case of the male dog, particularly with respect to the short-legged and body-elongated type male dog such as a miniature dachshund, since a length of the diaper is short, it is impossible to conceal the urethral opening in the diaper. Further, even when the urethral opening can be concealed in the diaper, there exists a possibility that the diaper is displaced due to putting the diaper for a long time and the urethral opening is exposed to the outside of the diaper.

In this manner, even when the diaper is put on the male dog, the urethral opening of the male dog is not concealed and is exposed to the outside and hence, the diaper cannot dispose a waste such as urine or the like whereby the dog evacuates the bowels at places where the owner cannot take care of the dog and hence, the residence of the owner is smeared with feces and urine.

Further, even when the length of the diaper is elongated such that the diaper covers the urethral opening of the male dog, the position where the diaper is fixed assumes the center portion of the trunk and a surrounding length of a portion which is near a waist portion and anterior to hider legs is shortest size, therefore, when the diaper is put for a long time, a taped-fixing portion of the diaper is easily displaced to a position i in front of the hind leg whereby it is difficult to cover the urethral opening of the male dog and the urine leaks from the diaper.

The present invention has been made by focusing on these drawbacks which are present in the prior art and it is an object of the present invention to provide a diaper for a male pet which is not displaced even when the diaper is used for a long time and can surely trap urine or the like by covering a urethral opening of a male pet.

SUMMARY OF THE INVENTION

To solve the above-mentioned drawbacks, according to the present invention, the present invention is completed on a finding that by adopting the structure in which a diaper is fixed at a waist portion of a pet where the displacement of the diaper can be prevented most effectively using a fixing tape and a urine absorbing body has a urine capture region which extends toward the head of the pet from the portion where the fixing tape is located, whereby it is possible to always cover a urethral opening and the vicinity of the urethral opening of a male pet and thus preventing spilling the evacuation such as urine at undesired places.

To be more specific, the present invention provides a diaper having following constitutions.

(1) A diaper for a male pet which is put on a male pet and includes a diaper body having a back pad portion which is brought into contact with the vicinity of a back of the male pet, a crotch pad portion which is brought into contact with the vicinity of a crotch of the male pet, and a belly pad portion which is brought into contact with the vicinity of a belly of the male pet, wherein the diaper for a male pet further includes a urine capture member which has a urine capture region which is arranged at a position and is set to a size to allow to cover a urethral opening of the male pet and the vicinity of the urethral opening when the diaper for a male pet is put on the male pet and includes a urine absorbing body which absorbs urine; and a holding structure which holds the diaper such that the urine capture region is brought into contact with the belly of the male pet even after the urine absorbing body absorbs urine.

The diaper for a male pet may adopt an open-type by forming the diaper body into an approximately elongated sheet shape or a panty-type. The diaper body may be provided with a pair of fixing tapes which extend to the outside of the diaper body on both sides of the belly pad portion. Although the urine capture region may be formed on the diaper body and the urine capture member may be integrally formed with the diaper body, the urine capture member may be formed as an independent body which is separable from the diaper body and the urine capture region may be formed on the urine capture member which constitutes the independent body.

(2) The diaper for a male according to (1), wherein the diaper body further includes a tail passing hole which allows a tail to pass therethrough at a position which corresponds to the tail of the male pet when the crotch portion is fitted to the crotch of the male pet; the urine absorbing body and fixing tapes which are provided at a position corresponding to a waist portion of the male pet when the diaper put on the male pet and extend outwardly from both side peripheries of the diaper body are mounted on the belly pad portion; and the urine capture region extends in the direction opposite to the crotch portion from the position where the fixing tapes are formed.

According to this invention, when the diaper for a male pet is fitted on the male pet, with the use of the fixing tapes which are formed such that the fixing tapes extend outwardly in the widthwise direction from both side peripheries of the belly pad portion of the diaper body, the diaper for a male pet is fixed at a waist portion which is a portion where a girth of the male pet is shortest and hence, the diaper for a male pet is not displaced even when the diaper for a male pet is fitted on the male pet for a long time. Further, the belly pad portion includes the urine capture region which extends in the direction opposite to the crotch pad portion (head portion of the male pet) from the crotch portion and is set to a size such that the urine absorbing body covers the urethral opening of the male pet and the vicinity of the urethral opening when the diaper is put, it is possible to absorb the excreted urine. Further, since the urethral opening of the male pet and the vicinity of the urethral opening are covered with the holding structure which prevents the sagging of the urine capture region even after the urine capture region absorbs the urine, the urine capture region is held in a state that the urine capture region is brought into contact with the belly of the male pet whereby the urine capture region absorbs the urine without leaking the urine, even after the urine absorbing body absorbs the urine. Further, the diaper body is fixed to the waist portion of the pet using the fixing tapes as mentioned above and hence, it can be prevented that the diaper body is displaced because the urine capture region is also prevented from being displaced even when the diaper is fitted on the male pet for a long time. Accordingly, the urethral opening of the pet does not stick out from the urine capture region and hence, it is possible to prevent the evacuation of bowels such as urines from being spilled at undesired places.

Here, as the holding structure, for example, the structure which increase the flexural rigidity of the urine absorbing body per se, the structure which holds the urine capture region by engaging the urine capture region with the trunk of the pet or the like using sustaining members or the like, or the structure which supports the urine capture region with a rigid member having a high flexural rigidity or the like may be used.

When the flexural rigidity of the urine absorbing body per se is increased or the urine capture region is supported by the rigid member having a high flexural rigidity to prevent the sagging of the urine capture region even after the urine capture region absorbs the above-mentioned urine or the like, it is preferable that the flexural rigidity of the urine absorbing body or the flexural rigidity of the rigid member which supports the urine capture region is preferably set such that "the bending resistance according to a 45° cantilever method" stipulated in JIS L 1096 "General Textile Testing Method" assumes 40 mm or more in the head direction (the longitudinal direction of the diaper body) and assumes 40 mm or more in the side surface direction (the width direction of the diaper body). It is more preferable that the bending resistance assumes 40 to 150 mm. When the bending resistance is larger than 150 mm, the rigidity is increased and hence, the pet feels discomfort and hates to wear the diaper and hence, it is not preferable to set the bending resistance to 150 mm or more. Here, the value of the flexural rigidity differs depending on a size of the urine capture region which covers the urethral opening and the vicinity of the urethral opening, which vary depending on a kind and a size of the pet.

Further, to hold the urine capture region by sustaining the urine capture region with the trunk or the like of the pet using the sustaining member or the like, the sustaining members are mounted on the side peripheries of the urine capture region at the head side of the pet and the sustaining members are wrapped around the trunk or the neck of the pet so as to hold the urine capture region in a suspending manner. For example, one ends of the respective sustaining members are fastened to each of both side peripheries of the urine capture region in the widthwise direction (the widthwise direction of the diaper body and the II—II direction in FIG. 1), while another ends of the respective sustaining members are wrapped around from both sides of the trunk of the pet and are engaged with each other by means of a mechanical engagement or an engagement using an adhesive material thus holding the urine capture region in a suspending manner. Further, by hooking one ends of the sustaining members to one side peripheries in the widthwise direction of the urine capture region and by making another ends of the sustaining members turn around the trunk of the pet by one turn and engaging another ends with another side peripheries of the urine capture region by means of a mechanical engagement or an engagement using an adhesive material, the urine capture region is held in a suspended manner. Further, the sustaining members are fastened to the side peripheries at the head side of the urine capture region in the longitudinal direction (I—I direction in FIG. 1) in the above-mentioned manner and are made to lay over the neck of the pet like a suspender used by human thus holding the urine capture region in a suspending manner.

Further, when the sustaining members are made of a material which expands and contracts such as rubber, the sustaining members can follow the movement of the pet and hence, the fitting feeling when the sustaining members are fitted on the pet is enhanced. Accordingly, the use of such a material is preferable. Further, by forming an anti-slip material such as PE (polyethylene) having a low molecular weight, rubber or the like on surfaces of the sustaining members which are brought into contact with the body of the pet, it is possible to prevent the displacement of the sustaining members even when the pet moves around while wearing the diaper for a male pet. Accordingly, the provision of the anti-slip material is more preferable.

(3) The diaper for a male pet according to (2), wherein the urine capture region extends toward the head of the male pet from the position where the fixing tapes are formed.

According to this invention, the urine capture region extends toward the head of the male pet from a portion which is located in the belly side and near the waist portion of the male pet which is arranged at the position where the fixing tapes are formed and hence, even when an urethral opening is at an approximately center of a trunk as in the case of the male pet, it is possible to cover the urethral opening and the vicinity thereof with the urine capture region. Further, fixing of the diaper for a male pet by the fixing tapes is performed at the waist portion where the girth of the pet is shortest and hence, even when the male pet wears the diaper for a long time, the displacement of the diaper for a male pet can be prevented and hence, the displacement of the urine capture region can be prevented whereby the urethral opening and the vicinity thereof are always covered with the urine capture region and a possibility that the urine or the like leaks can be suppressed.

(4) The diaper for a male pet according to any one of (1) to (3), wherein a bending resistance of the urine absorbing body according to the cantilever method of JIS in the head direction and in the side surface direction is 40 mm to 150 mm.

According to this embodiment, since the flexural rigidity of the urine absorbing body per se expressed by the bending resistance of the urine absorbing body according to the cantilever method of JIS is 40 mm to 150 mm and hence, even after the urine absorbing body absorbs the urine, the urine capture region does not sag downwardly in the head direction as well as in the side surface direction and is brought into contact with the belly of the pet. That is, as explained in conjunction with the constitution (3), the urine capture region has the approximately elongated shape which extends toward the head from the waist portion where the fixing tapes are formed, and one end of the urine capture region is held by the fixing tapes, another end is not held. Therefore, the urine capture region assumes a cantilever state. However, since the urine absorbing body has the above mentioned bending resistance, even after the urine absorbing body absorbs the urine, the sagging of the urine capture region can be prevented. Accordingly, the urine capture region is always held in a state that that the urine capture region is brought into contact with the belly of the pet and the urethral opening and the vicinity thereof are covered with the urine capture region whereby the leaking of urine or the like can be prevented.

Figure 1:
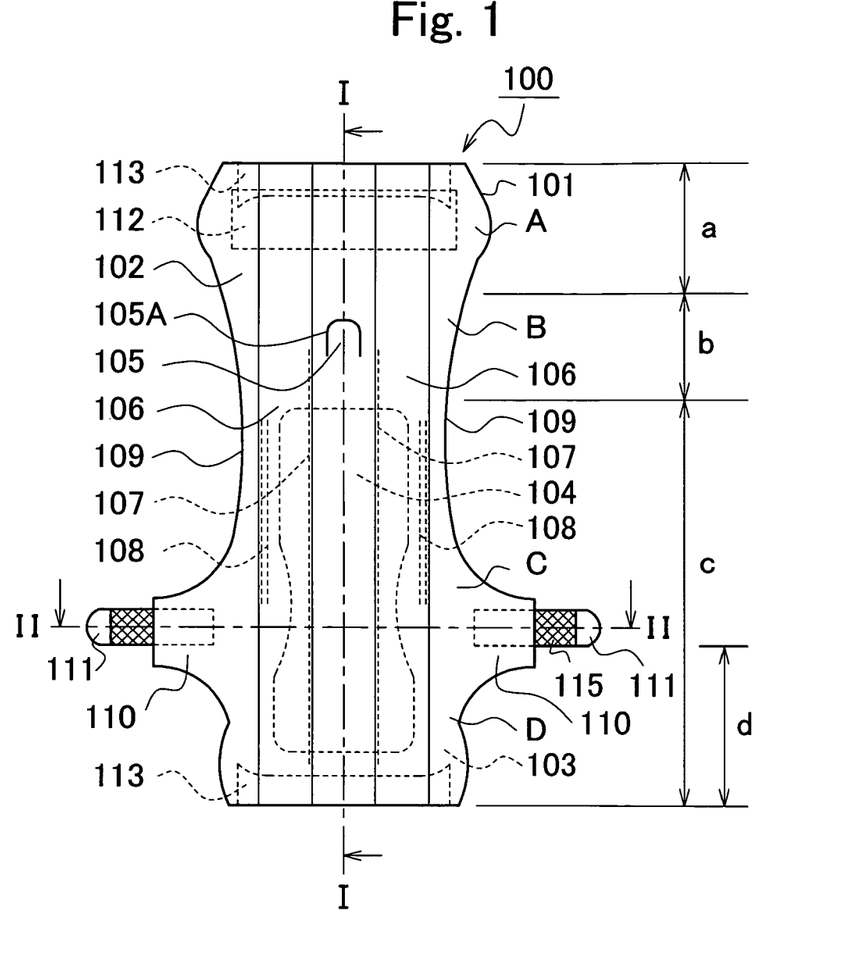
FIG. 1 is an explanatory view of the constitution of a first embodiment of a diaper for a male pet according to the present invention and also is a view which shows a state in which a front surface side (body surface side) of the embodiment is unfolded.

Here, the head direction implies the longitudinal direction of the diaper for a male pet (I—I direction in FIG. 1) and the side surface direction implies the widthwise direction of the diaper for a male pet (II—II direction in FIG. 1).

(5) The diaper for a male pet according to any one of (1) to (3), wherein the holding structure is constituted such that the urine capture region is held by approximately strip-like sustaining members which are formed on side peripheries of the urine capture region and makes a circuit of the trunk of the male pet.

According to this embodiment, the urine capture region is held by the sustaining members which are formed on the side peripheries of the urine capture region such that the sustaining member girdles the trunk of the pet and hence, even when the flexural rigidity of the urine capture region is low, it is possible to always hold the urine capture region in a state that that the urine capture region is brought into contact with the belly of the pet and the urethral opening and the vicinity thereof are covered with the urine capture region whereby the leaking of urine or the like can be prevented.

(6) The diaper for a male pet according to (5), wherein the sustaining members are respectively formed on both side peripheries of the urine capture region, one end portions of each of the sustaining members are fixed to one side peripheries of the urine capture region and another end portions of each of the sustaining members are formed in an extending manner to the outside whereby one end portions and another end portions are engaged with each other on the trunk of the male pet when the diaper put on.

According to this invention, the sustaining members have one ends thereof fixed to the respective side peripheries of the urine capture region in the widthwise direction and another ends thereof extended outwardly in the widthwise direction and hence, when the diaper for a male pet is put on the male pet, another ends of the respective sustaining members are wrapped around the trunk of the pet and are engaged with each other so as to engage the urine capture region with the body portion and hence, the urine capture region can be suspended by the sustaining members. Therefore, even when the flexural rigidity of the urine capture region is low, it is possible to hold the urine capture region in a state that the urine capture region is brought into contact with the belly of the pet. Accordingly, even after the urine absorbing body absorbs the urine, the urethral opening and the vicinity of the urethral opening are covered with the urine capture region and hence, the leaking of urine or the like can be prevented. Here, although the number of the sustaining members depends on the size of the urine capture region or the like, the sustaining members may be provided in plural numbers.

(7) The diaper for a male pet according to (5), wherein the sustaining members are formed on one side peripheries of the urine capture region, and when the diaper is put on the male pet, one of the sustaining members makes a circuit of the trunk and is engaged with another side periphery sides of the urine capture region.

According to this invention, when the diaper for a male pet is put on the male pet, the sustaining members which have one ends thereof fixed to the side peripheries of the urine capture region make a circuit of the trunk and are engaged with another side peripheries of the urine capture region so as to engage with the urine capture region. Accordingly, the urine capture region is suspended by the sustaining members and hence, even when the flexural rigidity of the urine capture region is low, it is possible to hold the urine capture region in a state that the urine capture region is brought into contact with the belly of the pet. Accordingly, even after the urine absorbing body absorbs the urine, the urethral opening and the vicinity of the urethral opening are covered with the urine capture region and hence, the leaking of urine or the like can be prevented. Here, although the number of the engaging members depends on the size of the urine capture region or the like, the engaging members may be provided in plural numbers.

(8) The diaper for a male pet according to any one of (5) to (7), wherein an anti-slip function is imparted to a side of the sustaining members which is brought into contact with the male pet.

According to this invention, since the anti-slip function is imparted to sides of the sustaining members which is brought into contact with the body portion of the pet, even when the pet moves around while wearing the diaper for a male pet, the sustaining member is hardly moved. Accordingly, it is possible to make the urine capture region held by the sustaining members difficult to be displaced. As a material which imparts the slip prevention function, PE (polyethylene) of a low molecular weight, rubber and the like are illustrated.

(9) The diaper for a male pet according to any one of (5) to (8), wherein the urine capture region is held in a suspending manner by the sustaining member which has one end fixed to the urine capture region and makes a circuit of the trunk the male pet.

According to this invention, since the urine capture region is held in a suspending manner from the trunk of the pet by the sustaining members, even when the diaper for a male pet is fitted on the male pet, a discomfort brought about by tightening the body of the pet can be eliminated and it is possible to always hold a state that the urine capture region is brought into contact with the belly.

(10) The diaper for a male pet according to any one of (1) to (3), wherein the holding structure is constituted such that the urine capture region is held by an approximately planar rigid member which is formed on a back surface of the urine absorbing body of the urine capture region.

According to this invention, since the approximately planar rigid member is formed on the back surface of the urine absorbing body of the urine capture region and the urine capture region is held by the rigid member such that the urine capture region is brought into contact with the belly of the pet, it is possible to prevent the sagging of the urine capture region. With respect to the rigid member, as long as the rigid member can hold the urine absorbing body of the urine capture region, a material of the rigid member is not particularly limited. For example, as the material of the rigid member, plastic such as polypropylene (PP), PE, polyethylene terephthalate (PET), a synthetic sheet which contains PP as a main component, a cardboard or the like is named. Further, it is preferable that a size of the rigid member is greater than a size of the urine absorbing body of the urine capture region. That is, it is preferable that the rigid member has a width greater than a width of the urine absorbing body of the urine capture region and a length of the rigid member is a length enough to cover a region ranged from a position nearer to the tail-side than a position having the fixing tapes which fix the diaper for a male pet to a head side end portion of the urine absorbing body or longer than this. d.

(11) The diaper for a male pet according to (10), wherein a bending resistance of the rigid member according to the cantilever method of JIS in the head direction and in the side surface direction respectively is 40 mm to 150 mm.

Figure 4:
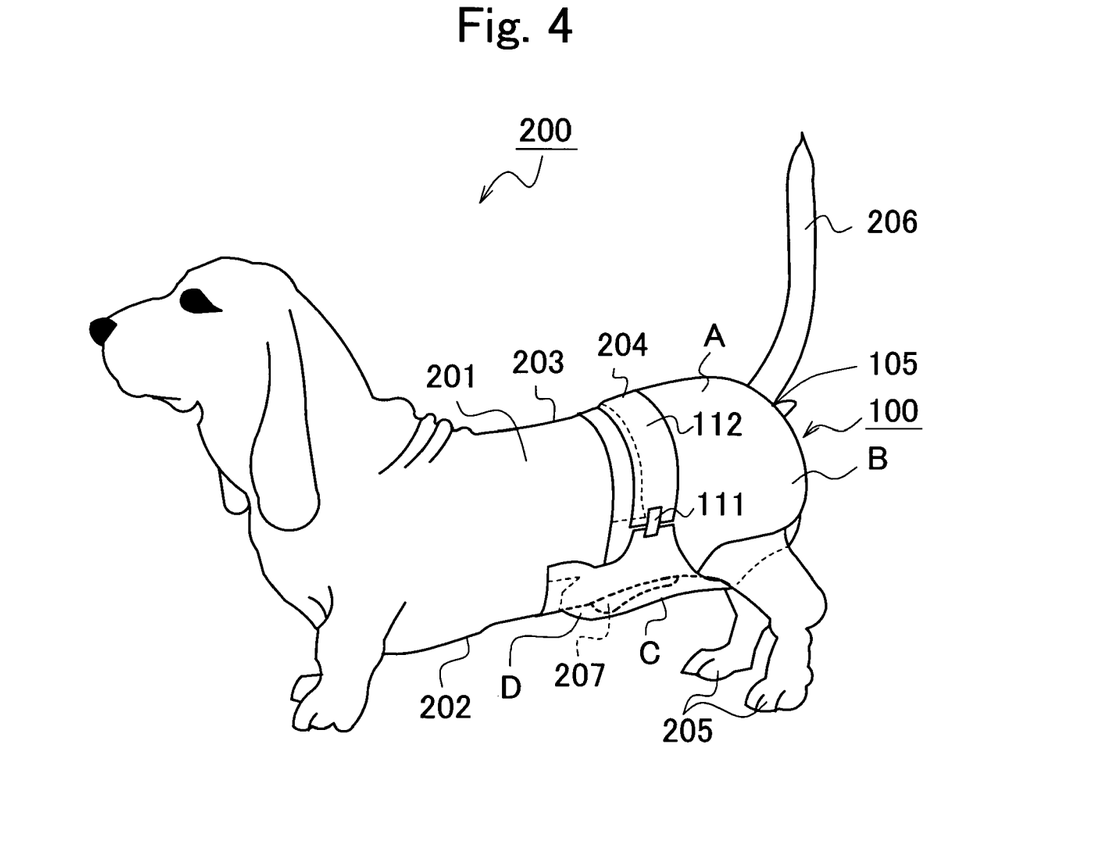
FIG. 4 is an explanatory view of the constitution of an example of use in a state that the diaper for a male pet of the first embodiment is used.

According to this embodiment, since the urine capture region is held by the rigid member having the bending resistance according to above-mentioned cantilever method of JIS of 40 mm to 150 mm in the head direction and in the side surface direction, even after the urine absorbing body absorbs the urine as mentioned in conjunction with FIG. 4, the sagging of the urine capture region can be prevented whereby the urine capture region is always held in a state that the urine capture region is brought into contact with the belly of the pet and the urethral opening and the vicinity thereof are covered with the urine capture region whereby the leaking of urine or the like can be prevented.

(12) The diaper for a male pet according to (10), wherein the holding structure is constituted of the rigid member which supports the urine capture region in the head direction and the rigid member which supports the urine capture region in the side surface direction; and the bending resistance of the rigid members according to the cantilever method of JIS in the directions that the rigid members support the urine capture region is 40 mm to 150 mm.

According to this invention, the structure which holds the urine capture region is the combination of the rigid member having the cantilever bending resistance of 40 to 150 mm according to the cantilever method of JIS in the side surface direction and the rigid member having the cantilever bending resistance of 40 to 150 mm according to the cantilever method of JIS in the head direction. Therefore, even after the urine absorbing body absorbs the urine, the sagging of the urine capture region in both of the side surface direction and the head portion direction can be prevented. Accordingly, the urine capture region is held in a state that that the urine capture region is brought into contact with the belly of the pet and the urethral opening and the vicinity thereof are covered with the urine capture region whereby the leaking of urine or the like can be prevented.

(13) The diaper for a male pet according to any one of (1), or (3) to (12), wherein the urine capture region is formed separately from the diaper body.

According to this invention, since the urine capture region is separated from the diaper body, that is, since the urine capture member is constituted as a independent body separate from the diaper body, a diaper for a male pet which has no urine capture region is applicable to a pet such as a female pet whose urethral opening is not remote from a tail. By separating only the urine capture member having the urine capture region from the diaper body as the independent body, a portion of the diaper which is brought into contact with the belly of the female pet becomes shorter by a length corresponding to the unnecessary urine capture region thus preventing the female pet from having a discomfort around the belly. Further, it is unnecessary to prepare the diaper for a female pet which does not require the urine capture member and the diaper for a male pet which has the urine capture member separately and hence, the use of the diaper of this invention is economical. Further, since the urine capture member constitutes the independent body with respect to the diaper body, for example, the urine capture member can be also used in a currently commercially available diaper for a pet in addition to the diaper for a male pet of this invention.

(14) The diaper for a male pet according to any one of (2) to (13), wherein the fixing tapes are fastened to the diaper body by heat sealing.

(15) The diaper for a male pet according to any one of (2) to (14), wherein the fixing tapes are fastened to the diaper body by the mechanical engagement.

According to the present invention, since the fixing tape has the structure to be fastened by the mechanical engagement, it is possible to perform the fixing of the diaper for a male pet in a snap-fit manner thus facilitating putting and taking off the diaper for a male pet. As such a mechanical engagement, for example, a male-side engaging lug such as an engaging lug having a hook-shaped engaging element or an engaging lug having a mushroom type engaging element is mounted on one end of the fixing tape and this male-side engaging lug is mechanically engaged with a loop-shaped mounting portion which is mounted on the diaper for a male pet.

(16) The diaper for a male pet according to any one of (2) to (14), wherein the fixing tapes are fastened to the diaper body using an adhesive material.

According to this invention, since the fixing tapes are fastened using an adhesive material, the fixing of the diaper for a male pet can be performed in a snap-fit manner thus facilitating putting and taking off the diaper for a male pet. As such an engagement using the adhesive material, for example, a film to which a rubber-based adhesive material is applied is formed on one end of the fixing tape and the film portion is fastened to a film which is formed on the side of the diaper for a male pet which is subjected to the peeling treatment.

(17) The diaper for a male pet according to any one of (1) to (16), wherein the diaper for a male pet is an open-type diaper.

According to this invention, it is possible to easily perform an operation to allow the tail to pass through the tail passing hole using the open-type diaper.

(18) The diaper for a male pet according to any one of (1) to (16), wherein the diaper for a male pet is a panty-type diaper.

According to this invention, at the time of putting the diaper for a male pet on the pet, the fixing of the diaper for a male pet using the fixing tape which becomes necessary in the open-type diaper is unnecessary and hence, the diaper can be easily fitted on the pet thus enhancing the operability. That is, after allowing the legs of the pet to pass through openings formed in the diaper for a male pet around the legs, the diaper for a male pet is pulled upwardly to proximal ends of the legs and, thereafter, the tail is allowed to pass through the tail passing hole and the back pad portion and the belly pad portion are pulled upwardly to the body side thus fitting the diaper for a male pet on the pet.

According to the diaper for a male pet of the present invention, the fixing tapes are provided to positions allocated to the waist of the male when the diaper is put such that the fixing tapes extend outwardly from both side peripheries in the widthwise direction of the diaper body. The urine capture region including the urine absorbing body which has the length, the size and the arrangement sufficient to cover the urethral opening of the male pet and the vicinity of the urethral opening is provided to the belly pad portion. Further, the diaper for a male pet includes the holding structure which holds the urine capture region such that the urine capture region is brought into contact with the belly of the male pet even after the urine absorbing body absorbs the urine. Accordingly, when the diaper for a male pet is putt on the male pet, the fixing tapes are fixed at the waist portion where the girth of the pet is shortest and hence, the diaper for a male pet is hardly displaced during a period that the diaper for a male pet is fitted on the male pet. Accordingly, the urine capture region which covers the urethral opening of the pet and the vicinity of the urethral opening is also hardly displaced. Further, due to the provision of the holding structure which holds the urine capture region, even after the urine absorbing body absorbs the urine, the holding structure can hold the urine capture region such that the urine capture region does not sag and hence, the urine capture region is always brought into contact with the belly of the male pet. Accordingly, even when the diaper for a male pet is fitted on the male pet for a long time, the urethral opening of the male pet and the vicinity of the urethral opening are always covered with the urine capture region whereby it is possible to prevent the leaking of the urine difficult.

BRIEF DESCRIPTION OF THE DRAWINGS

FIG. 11A is an explanatory view of the constitution of a fourth embodiment of a diaper for a male pet according to the present invention and also is a plan view which shows a state in which a front surface side (body surface side) of the embodiment is unfolded, showing a diaper body FIG. 11B indicates a urine capture body which constitutes a separate body of the fourth embodiment shown in FIG. 11A

DESCRIPTION OF THE PREFERRED EMBODIMENT

Preferred embodiments of the present invention are explained hereinafter conjunction with drawing. However, the present invention is not limited to these embodiments.

Figure 2:
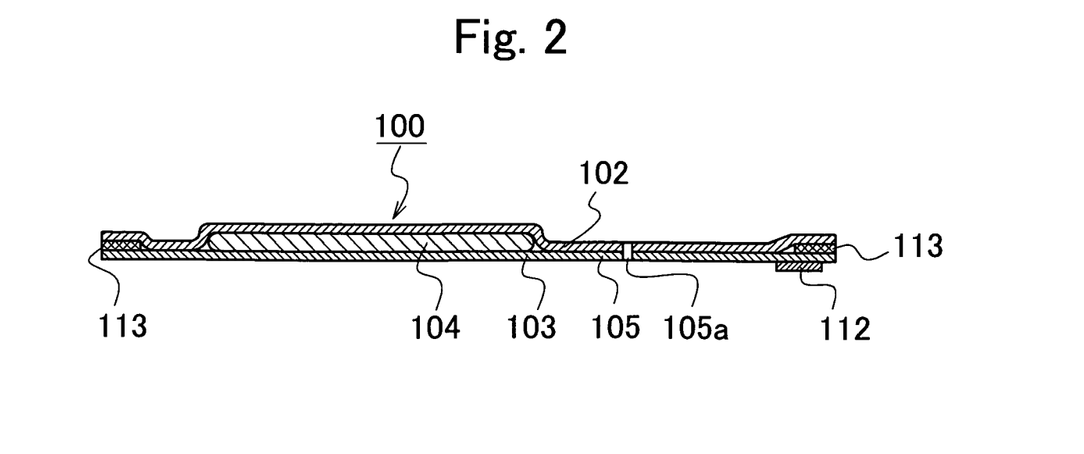
FIG. 2 is a cross-sectional view taken along a line I—I of the first embodiment shown in FIG. 1.
Figure 3:
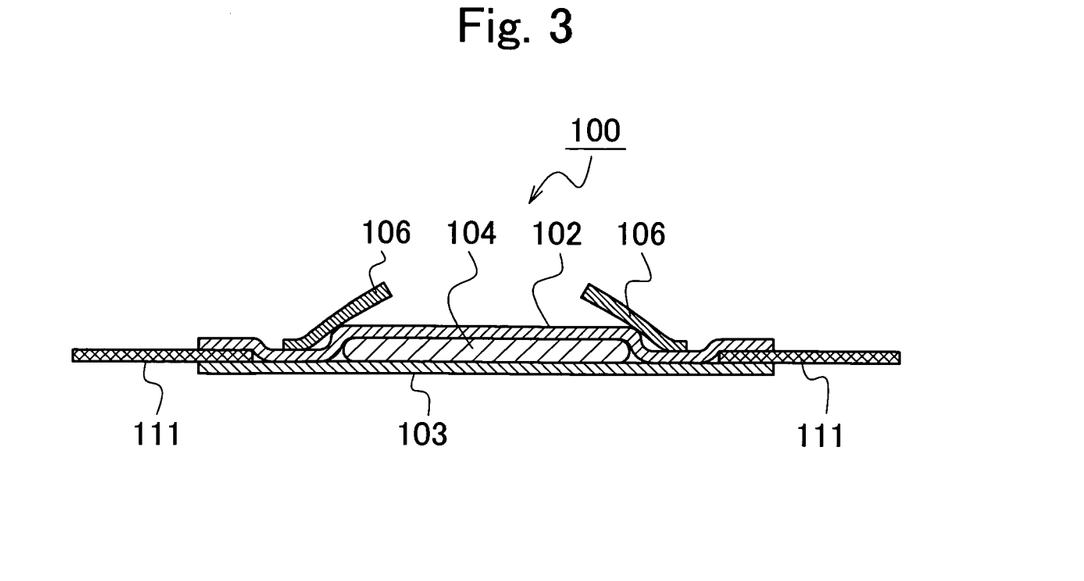
FIG. 3 is a cross-sectional view taken along a line II—II of the first embodiment shown in FIG. 1.

FIG. 1 is an explanatory view of the constitution of a first embodiment of a diaper for a male pet according to the present invention and also is a view which shows a state in which a front surface side (body surface side) which is a side which is brought into contact with the body of the male pet of the embodiment is unfolded. FIG. 2 is a cross-sectional view taken along a line I—I of the first embodiment shown in FIG. 1 and FIG. 3 is a cross-sectional view taken along a line II—II of the first embodiment shown in FIG. 1. In these drawings, to facilitate the understanding of the invention, sizes of the portions are suitably adjusted.

In FIGS. 1 to 3, a diaper for a male pet of the present invention indicated by numeral 100 is provided with a diaper body 101. The diaper body 101 includes a back pad portion A which is brought into contact with the vicinity of a back of a male dog 200, a crotch pad portion B which is brought into contact with the vicinity of a crotch of the male dog 200, and a belly pad portion C which is brought into contact with the vicinity of a belly of the male dog 200. In this embodiment, the diaper body 101 has an approximately rectangular sheet shape, wherein an approximately rectangular back pad portion A is formed on one end side in the longitudinal direction, the approximately rectangular belly pad portion C is formed on another end side in the longitudinal direction, the crotch pad portion B is arranged between the back pad portion a and the belly pad portion C and has an approximately rectangular shape. The diaper body 101 further includes a pair of fixing tapes 111 which are respectively mounted on both sides of the belly pad portion C and an urine capture region D which covers an urethral opening of the male pet and the vicinity thereof.

The diaper body 101 is constituted of a liquid permeable top sheet 102 (a sheet on a body surface side) which is formed of hydrophilic non-woven fabric (for example, point-bond non-woven fabric, through-air non-woven fabric, spun-bond non-woven fabric or the like) or an apertured film, a liquid non-permeable back sheet 103 (a sheet on a side opposite to the body surface side) which is formed of a waterproof film such as a synthetic resin film, an air permeable film, an air permeable-liquid interruption film or the like, and an urine absorbing body 104 which is provided between the top sheet 102 and the back sheet 103 at the belly pad portion C and absorbs liquid which permeates the top sheet 102. Here, it is preferable that the back sheet 103 is strengthened by including non-woven fabric in an outside of the waterproof film (a side opposite to the body surface side) to form a composite to prevent the breaking of the diaper body 101.

Further, at a portion of the diaper body 101 where a tail of the pet is positioned (a portion of the crotch portion B of the diaper body 101 in the vicinity of the back pad portion A) when the diaper body 101 is mounted, a tail passing hole 105 which allows the tail of the pet to pass therethrough is formed as a slit 105a. Further, in the vicinity of the side peripheries of the diaper body 101 in the widthwise direction, a pair of stereoscopic gathers 106 having a crape shape for preventing sideleakage of feces and urine are mounted on the top sheet 102 of the diaper body 101 along the longitudinal direction such that the stereoscopic gathers 106 are spaced apart from each other by a given distance. Further, in the vicinity of the stereoscopic gathers 106, elastic bodies 107 which impart the expansion and contraction property to the stereoscopic gathers 106 are arranged along the longitudinal direction. Further, on respective side peripheries of the diaper body 101 in the widthwise direction, elastic bodies 108 which impart the expansion and contraction property over a range from the crotch pad portion B to a middle portion of the belly pad portion C is formed. Still further, curved cut portions 109 are formed in the side peripheries in the widthwise direction of the approximately center portion of the diaper body 101 in the longitudinal direction (the side peripheries in the widthwise direction of a portion extending over an intermediate portion from the crotch pad portion B to the belly pad portion C), An approximately intermediate portion of the belly pad portion C has width expanding portions 110 having a width expanded shape which projects to both sides in the widthwise direction, wherein a pair of fixing tapes 111 which are served for fixing the diaper 100 for a male pet are mounted on these side peripheries. The fixing tapes 111 have respective one ends thereof sandwiched between the top sheet 102 and the back sheet 103, wherein the fixing tapes 111 are mounted by heat sealing and are formed such that the fixing tapes 111 extend toward the outside in the width direction of the diaper body 101 (the right direction and the left direction of the diaper body 101 shown in FIG. 1). Further, in the vicinity of the side peripheries of the back pad portion A which forms one end portion in the longitudinal direction of the diaper body 101, an adhesion portion 112 to which the fixing tapes 111 are fixed when the diaper 100 for a male pet is put is adhered to a surface of the back sheet 103 along the widthwise direction of the diaper body 101. Further, to both side peripheries on the longitudinal direction (I—I direction side) of the diaper body 101, a waist band 113 is adhered along the widthwise direction between the top sheet 102 and the back sheet 103 by heat sealing. Here, although it is preferable to provide the waist band 113 for fitting the side peripheries of the diaper body 101 on a body of the pet, the waist band 113 may be eliminated.

The above-mentioned urine absorbing body 104 is arranged between the top sheet 102 and the back sheet 103 over a region ranging from a part of the crotch pad portion B closer to the belly pad portion C than the tail passing hole 105 to the vicinity of the longitudinal side peripheries (the side peripheries in the longitudinal direction of the diaper body 101) on the belly pad portion C side of the diaper 100 for a male pet. The urine absorbing body 104 has a function of absorbing and holding liquid such as urine and is preferably formed of a material which is bulky, is hardly collapsed in shape and exhibits the small chemical stimulation. In general, as the material of the urine absorbing body 104, pulp, chemical pulp, rayon, acetate, natural cotton, a polymer absorbing body, a fiber-like polymer absorbing body, synthetic fibers can be used in a single form or in mixture. Further, the flexural rigidity of the urine absorbing body 104 is preferably set such that "the bending resistance according to a 45° cantilever method" stipulated in JIS L 1096 "General Textile Testing Method" assumes 40 mm or more in the head direction (the longitudinal direction of the diaper body 101, the I—I direction in FIG. 1) and assumes 40 mm or more in the side surface direction (the width direction of the diaper body 101, the II—II direction in FIG. 1). It is more preferable that the bending resistance assumes 40 to 150 mm. When the bending resistance is larger than 150 mm, the rigidity is increased and hence, the pet feels discomfort when the diaper is fitted thereon and hates to wear the diaper and hence, it is not preferable to set the bending resistance to 150 mm or more.

The urine absorbing body 104 includes a urine capture region D which has an approximately rectangular shape and has one end side thereof extended in the longitudinal direction toward the crotch pad portion B from the vicinity of the position at which the fixing tape 111 is formed (line II—II in FIG. 1) and has another end side extended to the side opposite to the crotch pad portion B so as to cover the urethral opening of the male pet and the vicinity thereof. In this manner, according to this embodiment, the urine capture region D is formed on the diaper body 101 and the urine capture member is integrally formed with the diaper body 101 (see FIG. 1 and FIG. 4).

In this embodiment, as the urine absorbing body 104, a material which has the bending resistance of approximately 60 mm and is formed by sandwiching pulp and high absorbent resin between upper and lower tissues is used. Accordingly, the urine absorbing body 104 per se is adopted as the holding structure which prevents the sagging of the urine absorbing region D. Here, the urine absorbing material 104 may be formed by mixing pulps and high water absorbing resin using binder and, molding the mixture, and holding a shape of a molded product and allowing the molded product to have the desired bending resistance. To be more specific, polyethylene is used as the binder, approximately fibers having the fineness of approximately 10 deci tex and the fiber length of approximately 25 mm are mixed to the pulps at a rate of 20%, and the mixture is heated and molded within an oven of approximately 150° C. and is molded. Here, as other binders, a hot melt-based adhesive agent, acrylic resin or the like may be used.

FIG. 4 is an explanatory view of the constitution of an example of use in a state that the diaper for a male pet according to the first embodiment is used. In the drawings, symbols which are equal to the symbols in FIG. 1 are used in the same meaning and repeated explanation is omitted.

Numeral 200 indicates a baby dog whose age is only a few months or so after he was born or a male dog which requires the owner's help to evacuate the bowels due to aging or an accident, numeral 201 indicates a trunk of the male dog, numeral 202 indicates a belly of the male dog, numeral 203 indicates a back of the male dog, numeral 204 indicates a waist portion of the male dog, numeral 205 indicates hind legs of the male dog, numeral 206 indicates a tail of the male dog, and numeral 207 indicates a urethral opening of the male dog.

Hereinafter, the specific manner of using the diaper 100 for a male pet according to the present invention is explained in detail in conjunction with FIGS. 1 and 4. First of all, the owner holds the diaper 100 for a male pet shown in FIG. 1 and allows the tail 206 of the male dog (male pet) 200 shown in FIG. 4 to pass through the tail passing hole 105. Next, the back pad portion A of the diaper body 101 shown in FIG. 1 is brought into contact with the back 203 of the male dog 200 shown in FIG. 4. Thereafter, the crotch portion B of the diaper body 101 shown in FIG. 1 is brought into contact with the crotch or the like of the male dog 200 such that a pair of curved notch portions 109 of the diaper body 101 shown in FIG. 1 are respectively brought into contact with thigh portions of a pair of hind legs 205 of the male dog 200 shown in FIG. 4. Next, the belly pad portion C of the diaper body 101 shown in FIG. 1 is brought into contact with the belly 202 of the male dog 200 shown in FIG. 4 and, thereafter, a pair of fixing tapes 111 which are fixed to the diaper body 101 shown in FIG. 1 are fastened to the adhesion portions 112 which is fixed to the back sheet 103 of the back pad portion A of the diaper body 101 thus fixing the diaper 100 for a male pet.

The fixing tapes 111 are provided at the positions which correspond to the waist portion 204 of the male dog 200 when the diaper 100 for a male pet is fitted on the male dog 200 and hence, the diaper 100 for a male pet is fixed to the portion of the male dog 200 where the girth is smallest whereby there is less possibility that the diaper 100 for a male pet is displaced even when the diaper 100 for a male pet is fitted on the male dog 200 for a long time. Accordingly, the possibility that the urine capture region D is displaced can be reduced.

By fixing the diaper 100 for a male pet, the urine capture region D which extends from the position where the fixing tapes 111 formed on the belly pad portion C toward the head portion side of the male dog 200 (side opposite to the crotch pad portion b and downward in FIG. 1) covers the urethral opening 207 of the male dog 200 and the vicinity of the urethral opening 207. The urine capture region D has an approximately rectangular shape which has one end thereof at the position where the pair of fixing tapes 111 are formed and a distal end thereof which extends in the direction opposite to the crotch pad portion B. The urine capture region D has one end to which the fixing tapes 111 are provided so that the urine capture region D is supported by the fixing tapes 111, while the other end brought into contact with the belly 202 in a cantilever state in which no support member is provided on the distal end side. However, in this embodiment, the urine absorbing body 104 formed on the urine capture region D is configured to have the high flexural rigidity with the bending resistance of approximately 60 mm or more and hence, the urine absorbing body 104 per se functions as the holding structure which prevents the sagging of the urine capture region D. Accordingly, even in a state that the distal end side of the urine capture region D is not provided with a support member, the urine capture region D is brought into contact with the urethral opening 207 of the male dog 200 without sagging.

In this manner, the diaper 100 for a male pet of the first embodiment is fitted, as shown in FIG. 4, on the baby dog whose age is only a few months or so after he was born or the male dog 200 which requires the owner's help to evacuate the bowels due to aging or an accident. Further, the removal of the diaper 100 for a male pet from the male dog 200 is conducted in accordance with steps opposite to the above-mentioned fitting operation.

Figure 5:
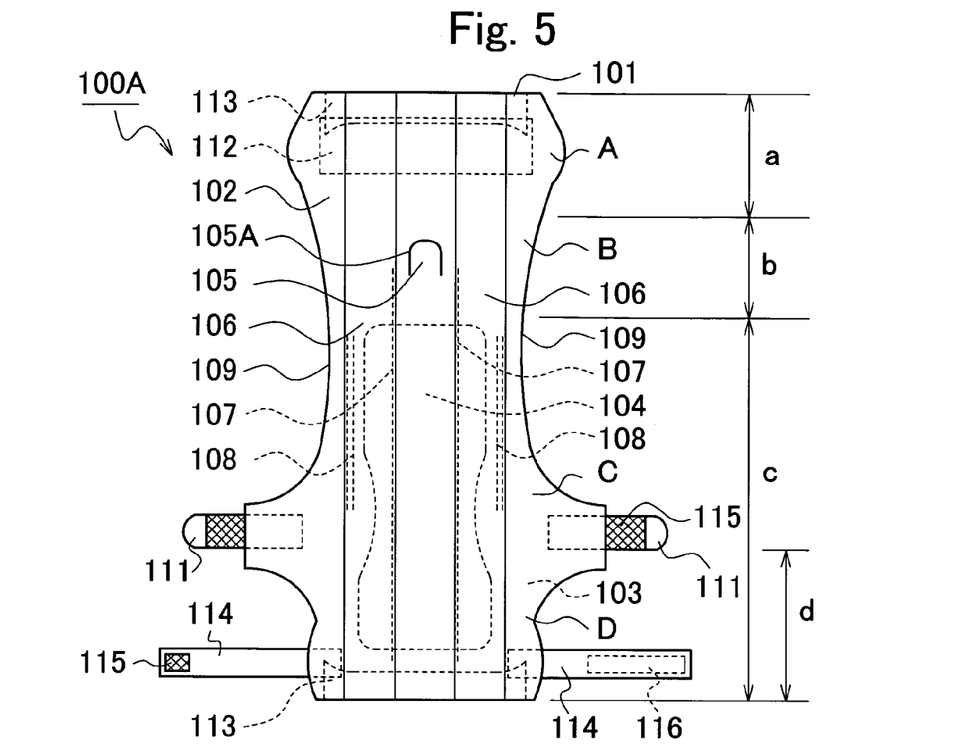
FIG. 5 is an explanatory view of the constitution of a second embodiment of a diaper for a male pet according to the present invention and is also a plan view which shows a state in which a front surface side (body surface side) of the embodiment is unfolded.

Next, a second embodiment of a diaper for a male pet according to the present invention is explained in conjunction with FIG. 5.

FIG. 5 is an explanatory view of the constitution showing the second embodiment of the diaper for a male pet according to the present invention and is also a plan view showing a state in which a surface side (a body surface side) of this embodiment is unfolded. To facilitate the understanding of the invention, the sizes are suitably adjusted in the drawing.

The diaper 100A for a male pet of this embodiment is characterized in that, as the holding structure, a pair of strip-like sustaining members 114 are formed on both side peripheries in the widthwise direction of the end portion of the diaper body 101 at the belly pad portion C side (the lower direction in FIG. 5), in the diaper 100 for a male pet of the first embodiment. That is, the fixing members 114 have one end fixed to a surface of the back sheet 103 by heat sealing at side peripheries in the widthwise direction of the urine capture region D of the belly pad portion C and the other end extended outwardly (in the right direction and the left direction in FIG. 5) in the widthwise direction, wherein both of the other ends of the fixing members are configured to be engaged with each other by the mechanical engagement. The mechanical engagement is performed such that, for example, a male-side engaging lug 115 such as an engaging lug which mounts a hook-shaped engaging element thereon or an engaging lug which mounts a mushroom type engaging element thereon is mounted on one distal end portion of one sustaining member 114, a loop-shaped engaging portion 116 is mounted on a distal end portion of another sustaining member 114, and the male-side sustaining member 115 is mechanically engaged with the loop-shaped engaging portion 116. Here, the method which makes the pair of sustaining members 114 engage with each other is not limited to the above-mentioned engagement using the hook-and-loop fastener. For example, it may be possible to adopt a method in which a film to which a rubber-based adhesive agent is applied is formed on one sustaining member 114 and a film which is subjected to the peel-off treatment is formed on another sustaining member 114 and these films are engaged with each other using the adhesive agent.

Further, although not shown in the drawing, on surfaces of the sustaining members 114 which are brought into contact with the trunk 201 of the male dog 200, an anti-slip portion made of PE (polyethylene) having a low molecular weight, rubber or the like may be formed. With the provision of the anti-slip portion, it is possible to prevent the displacement of the sustaining members 114 even when the pet moves around while wearing the diaper 100A for a male pet and hence, the urine capture region D is not displaced. Further, the sustaining members 114 may be formed of a material having the expansion and contraction property such as rubber. By adopting the sustaining members 114 having the expansion and contraction property, the urine capture region D is fitted on the body of the pet more snugly.

Accordingly, the provision of the sustaining members 114 having the expansion and contraction property is more preferable.

Further, although the sustaining members 114 may be prepared in plural numbers, it is preferable to hold the urine capture region D using a pair of sustaining members 114 as in the case of this embodiment from a cost standpoint.

Further, although not shown in the drawing, one elongated strip-like sustaining member may be used in place of the pair of sustaining members 114. To be more specific, it may be constituted such that a length of the sustaining member 114 is set to a value which allows the sustaining member 114 to surround the trunk 201 of the male dog 200 by at least one turn, one end of the sustaining member 114 is fixed to the surface of the back sheet 103 at one side periphery of the urine capture region D in the widthwise direction by heat sealing or the like and another end of the sustaining member 114 is extended outwardly in the widthwise direction, and another end portion is bonded to or engaged with a surface of the back sheet 103 of the diaper 100A for a male pet by the mechanical engagement or an adhesive agent.

In this diaper 100A for a male pet, one end of the approximately rectangular urine capture region D is held by the pair of fixing tapes 111 such that the urine capture region D is brought into contact with the belly 202 of the male dog 200, while another end of the urine capture region D is held by the sustaining members 114 such that the urine capture region D is brought into contact with the belly 202 of the male dog 200. In this manner, the sustaining members 114 are provided as the holding structure in this embodiment, the flexural rigidity of the urine absorbing body 104 is not particularly limited. That is, it is sufficient to set the flexural rigidity of the urine absorbing body 104 in a range which does not impede steps for manufacturing the diaper 100A for a male pet and hence, the flexural rigidity of the urine absorbing body 104 may be smaller than 40 mm. Further, the composition of the urine absorbing body 104 is, in the same manner as explained in conjunction with the diaper 100 for a male pet of the first embodiment, formed of pulps, chemical pulps, rayon, acetate, natural cotton, a polymer absorbing body, a fibrous polymer absorbing body, synthetic fibers in a single form or in mixture.

Here, other elements or materials which constitute the diaper 100A for a male pet are substantially equal to corresponding elements or materials of the diaper 100 for a male pet in the first embodiment, their explanation is omitted.

Figure 6:
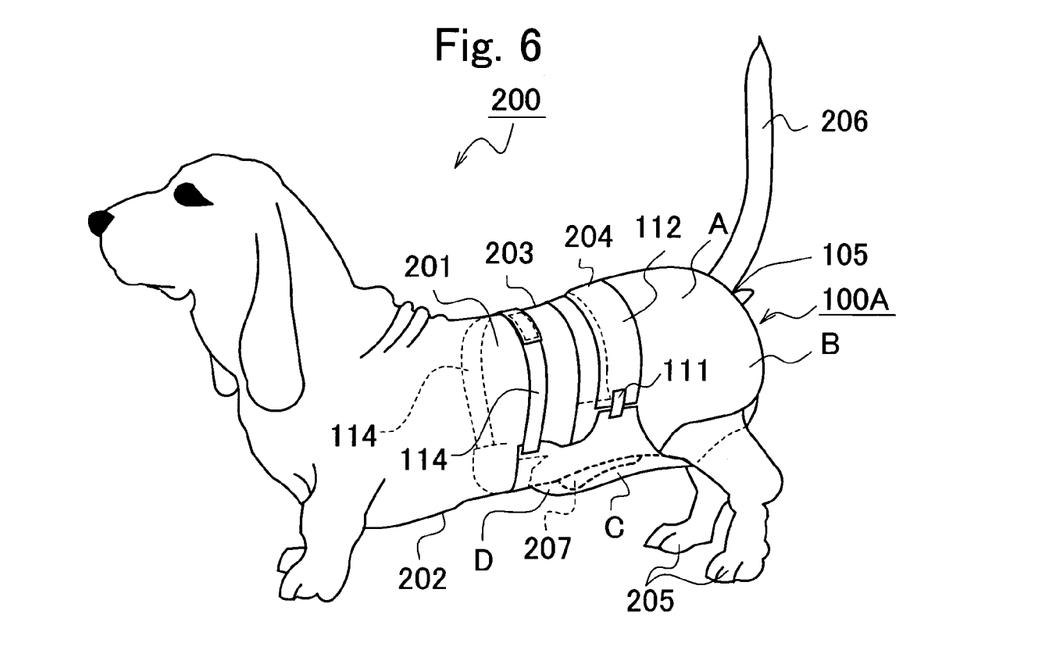
FIG. 6 is an explanatory view of the constitution of an example of use in a state that the diaper for a male pet of the second embodiment is used.

FIG. 6 is an explanatory view of the constitution of an example of use in a state that the diaper for a male pet according to the second embodiment is used. In the drawings, symbols which are equal to the symbols in FIGS. 1 to 4, are used in the same meaning and the repeated explanation is omitted.

Hereinafter, a specific example of manner of using the diaper 100A for a male pet of the second embodiment according to the present invention is explained in detail in conjunction with FIG. 5 and FIG. 6.

As explained in conjunction with the diaper 100 for a male pet of the first embodiment, first of all, the owner holds the diaper 100A for a male pet shown in FIG. 5 and allows the tail 206 of the male dog 200 shown in FIG. 6 to pass through the tail passing hole 105. Next, the back pad portion A of the diaper body 101 shown in FIG. 5 is brought into contact with the back 203 of the male dog 200 shown in FIG. 6. Thereafter, the crotch portion B of the diaper body 101 shown in FIG. 5 is brought into contact with the crotch or the like of the male dog 200 shown in FIG. 6 such that a pair of curved notch portions 109 of the diaper body 101 shown in FIG. 5 are respectively brought into contact with thigh portions of a pair of hind legs 205 of the male dog 200 shown in FIG. 6. Next, the belly pad portion C of the diaper body 101 shown in FIG. 5 is brought into contact with the belly portion 202 of the male dog 200 shown in FIG. 6 and, thereafter, a pair of fixing tapes 111 which are fixed to the diaper body 101 shown in FIG. 5 are fastened to the adhesion portions 112 which is fixed to a surface of the back sheet 103 of the back pad portion A of the diaper body 101 thus fixing the diaper 100A for a male pet.

Also in this case, the fixing tapes 111 are provided at the positions which correspond to the waist portion 204 of the male dog 200 where the girth is shortest when the diaper 100A for a male pet is fitted on the male dog 200 and hence, the diaper 100 for a male pet is fixed to the portion of the male dog 200 where the girth is smallest whereby the possibility that the diaper 100A for a male pet is displaced can be suppressed even when the diaper 100A for a male pet is fitted on the male dog 200 for a long time. Accordingly, the possibility that the urine capture region D is displaced also be supressed.

Next, the urethral opening 207 of the male dog 200 and the vicinity of the urethral opening 207 shown in FIG. 6 are covered with the urine capture region D which extends to the head portion side of the male dog 200 from the position where the fixing tables 111 are formed, the sustaining members 114 which are formed on the side peripheries of the urine capture region D are wrapped around the trunk 201, the urine capture region D is brought into contact with the belly 202, and distal end portions of the sustaining members 114 are engaged with each other by the mechanical engagement.

In this manner, the diaper 100A for a male pet of the second embodiment of the present invention is fitted, as shown in FIG. 6, on the baby dog whose age is only a few months or so after he was born or the male dog 200 which requires the owner's help to evacuate the bowels due to aging or an accident. Further, the removal of the diaper 100A for a male pet from the male dog 200 is conducted in accordance with steps opposite to the above-mentioned fitting operation.

Figure 7:
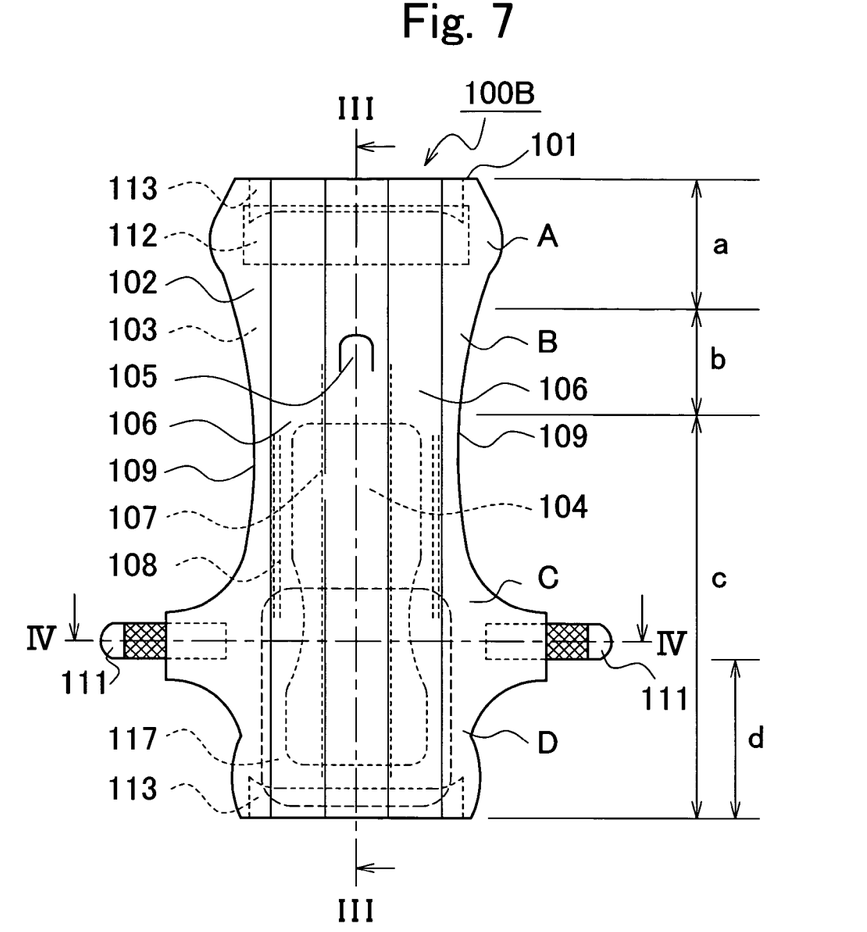
FIG. 7 is an explanatory view of the constitution of a third embodiment of a diaper for a male pet according to the present invention and is also a plan view which shows a state in which a front surface side (body surface side) of the embodiment is unfolded.
Figure 8:
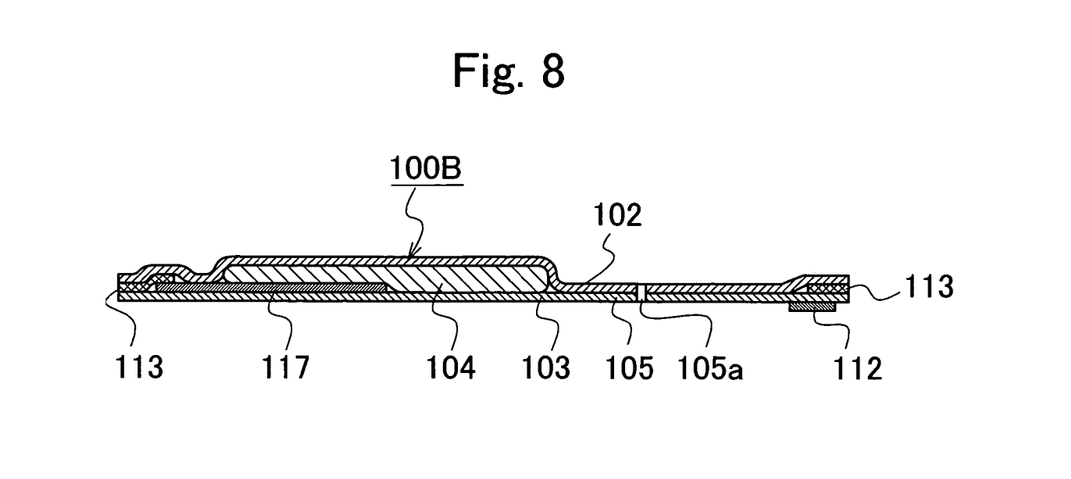
FIG. 8 is a cross-sectional view taken along a line III—III of the third embodiment shown in FIG. 7.
Figure 9:
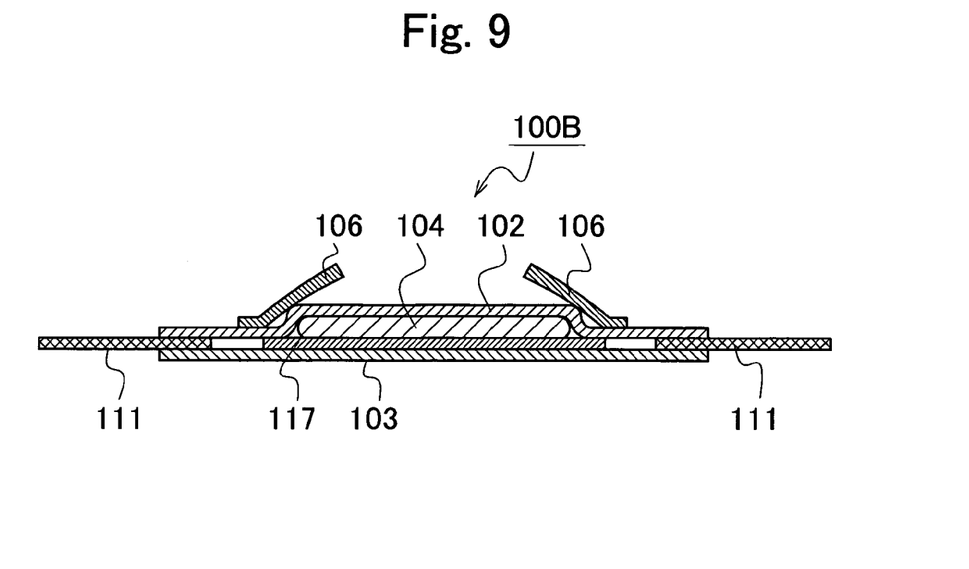
FIG. 9 is a cross-sectional view taken along a line IV—IV of the third embodiment shown in FIG. 7.

Next, a third embodiment of the diaper for a male pet according to the present invention is explained in conjunction with FIGS. 7 to 9.

FIG. 7 is an explanatory view of the constitution showing the third embodiment of the diaper for a male pet according to the present invention and is also a plan view showing a state in which a surface side (a body surface side) of this embodiment is unfolded. FIG. 8 is a cross-sectional view taken along a line III—III of the third embodiment shown in FIG. 7. FIG. 9 is a cross-sectional view taken along a line IV—IV of the third embodiment shown in FIG. 7. To facilitate the understanding of the invention, the sizes are suitably changed.

The diaper 100B for a male pet of the third embodiment is characterized in that a rigid member 117 is provided below the urine absorbing body 104 (between the urine absorbing body 104 and the back sheet 103) in the urine capture region D of the belly pad portion c as the holding structure, in the diaper 100 for a male pet of the first embodiment. That is, as shown in FIGS. 7 to 9, the rigid member 117 having a size which has a length covering the urine capture region D from a position slightly closer to the crotch pad portion B than the position where the fixing tapes 111 are formed and reaching an end periphery of the diaper body 101 at the belly pad portion C of the diaper body 101 and a width greater than a width of the urine absorbing body 104 is arranged between the urine absorbing body 104 and the back sheet 103.

The rigid member 117 is an approximately planar sheet member formed of plastic such as polypropylene (PP), PE, polyethylene terephthalate (PET), a synthetic sheet which contains PP as a main component, a cardboard or the like. Here, the flexural rigidities of the rigid member 117 in the head direction (longitudinal direction of the diaper body 101, the III—III direction in FIG. 7) and in the side surface direction (the widthwise direction of the diaper body 101, the IV—IV direction in FIG. 7) expressed by the bending resistance of the rigid member 117 according to the cantilever method of JIS are 40 mm to 150 mm respectively. The rigid member 117 may be formed of the urine absorbing body having the bending resistance which is in the above-mentioned range used in the first embodiment. By using a sheet-like material having the urine absorbing function as the rigid member 117, it is possible to enhance the urine absorbing function of the diaper 100B for a male pet.

Here, the rigid member 117 may be formed of, for example, a composite film which is formed by laminating at least one drawn film such as PP or the like which has the bending resistance of 40 to 150 mm in the head direction and at least one drawn film such as PP or the like which has the bending resistance of 40 to 150 mm in the side surface direction. Here, since the physical properties of the above-mentioned film such as PP or the like are changed whether the film has been drawn or not, or to which direction has the film been drawn, with the use of such a composite film, it is possible to obtain the difference in rigidity depending on the direction.

In this diaper 100B for a male pet, since the whole urine capture region D is held by the rigid member 117 such that the urine capture region D is brought into contact with the belly 202 of the male dog 200 and hence, the flexural rigidity of the urine absorbing body 104 is not particularly limited. That is, it is sufficient to set the flexural rigidity of the urine absorbing body 104 in a range which does not impede steps for manufacturing the diaper 100B for a male pet and hence, the bending resistance of the urine absorbing body 104 may be smaller than 40 mm. Further, the composition of the urine absorbing body 104 is, in the same manner as explained in conjunction with the diaper 100 for a male pet of the first embodiment, formed of pulps, chemical pulps, rayon, acetate, natural cotton, a polymer absorbing body, a fibrous polymer absorbing body, synthetic fibers in a single form or in mixture.

Here, other elements or materials which constitute the diaper 100B for a male pet are substantially equal to corresponding elements or materials of the diaper 100 for a male pet in the first embodiment, their explanation is omitted. Further, the sustaining members 114 may be provided to the diaper 100B for a male pet according to the third embodiment in the same manner as the diaper 100A for a male pet according to the second embodiment.

Figure 10:
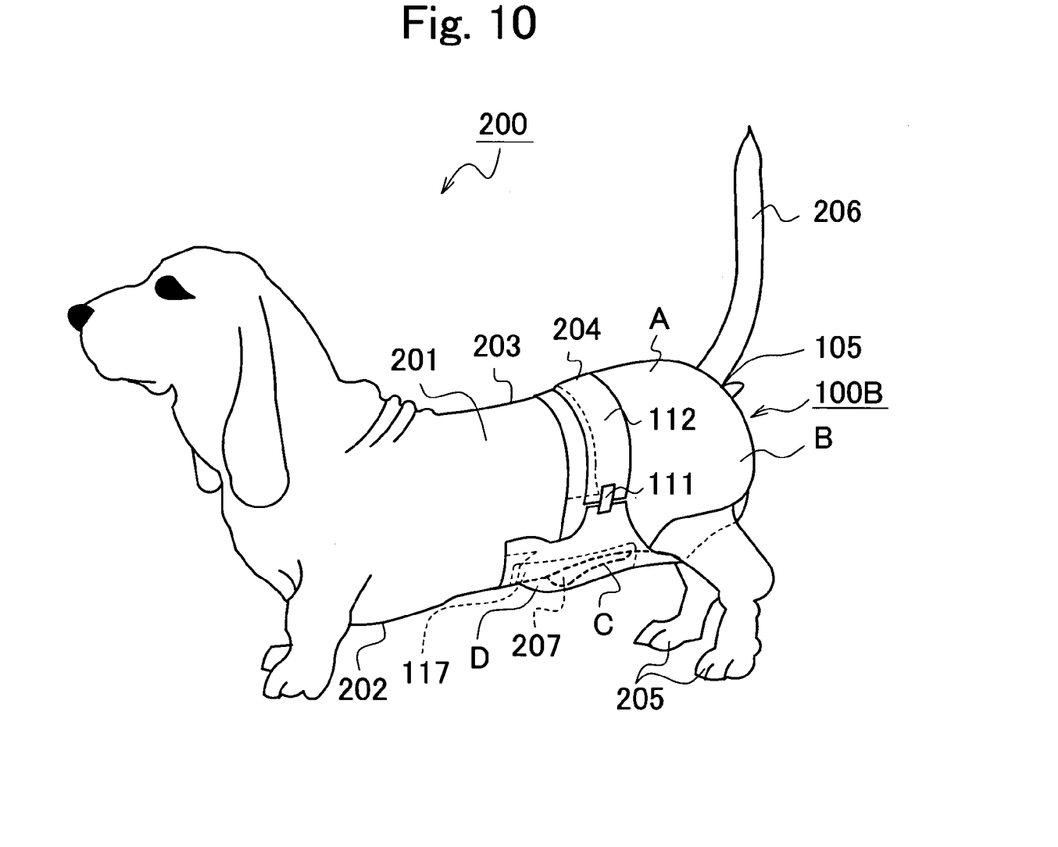
FIG. 10 is an explanatory view of the constitution of an example of use in a state that the diaper for a male pet of the third embodiment is used.

FIG. 10 is an explanatory view of the constitution of an example of use in a state that the diaper for a male pet according to the third embodiment is used. In the drawings, symbols which are equal to the symbols in FIGS. 1 to 4, are used in the same meaning and repeated explanation is omitted.

Hereinafter, a specific example of manner of using the diaper 100B for a male pet of the third embodiment according to the present invention is explained in detail. As explained in conjunction with the diaper 100 for a male pet of the first embodiment, first of all, the owner holds the diaper 100B for a male pet shown in FIG. 7 and allows the tail 206 of the male dog 200 shown in FIG. 10 to pass through the tail passing hole 105. Next, the back pad portion A of the diaper body 101 shown in FIG. 7 is brought into contact with the back 203 of the male dog 200 shown in FIG. 10. Thereafter, the crotch pad portion B of the diaper body 101 shown in FIG. 7 is brought into contact with the crotch or the like of the male dog 200 shown in FIG. 10 such that a pair of curved notch portions 109 of the diaper body 101 shown in FIG. 7 are respectively brought into contact with thigh portions of a pair of hind legs 205 of the male dog 200 shown in FIG. 10. Next, the belly pad portion C of the diaper body 101 shown in FIG. 7 is brought into contact with the belly 202 of the male dog 200 shown in FIG. 10 and, thereafter, a pair of fixing tapes 111 which are fixed to the diaper body 101 shown in FIG. 7 are fastened to the adhesion portions 112 which is fixed to a surface of the back sheet 103 of the back pad portion A of the diaper body 101 thus fixing the diaper 100B for a male pet.

In this case, in the same manner as the diaper 100 for a male pet of the first embodiment, the fixing tapes 111 are provided at the positions which correspond to the waist portion 204 of the male dog 200 where the girth is shortest when the diaper 100B for a male pet is fitted on the male dog 200 and hence, the diaper 100B for a male pet is fixed to the portion of the male dog 200 where the girth is smallest whereby the possibility that the diaper 100B for a male pet is displaced can be suppressed even when the diaper 100B for a male pet is fitted on the male dog 200 for a long time. Accordingly, there is also no possibility that the urine capture region D is displaced.

By fixing the diaper 100B for a male pet, the urine capture region D which is supported by the rigid member 117 covers the urethral opening 207 of the male dog 200. Further, one end side of the urine capture region D is pushed to the belly 202 of the male dog 200 using the fixing tapes 111. Although there is no member which pushes another end of the urine capture region D to the belly 202, one end of the rigid member 117 which is difficult to bend is brought into contact with the belly 202 in a state that one end of the rigid member 117 is supported on the fixing tapes 111 in a cantilever manner and hence, the urine capture region D is held in a state that the urine capture region D is brought into contact with the belly 202.

In this manner, the diaper 100B for a male pet of the third embodiment of the present invention is fitted, as shown in FIG. 10, on the baby dog whose age is only a few months or so after he was born or the male dog 200 which requires the owner's help to evacuate the bowels due to aging or an accident. Further, the removal of the diaper 100B for a male pet from the male dog 200 is conducted in accordance with steps opposite to the above-mentioned fitting operation.

Next, the fourth embodiment of the diaper for a male pet according to the present invention is explained in conjunction with FIGS. 11A and 11B.

Figure 11:
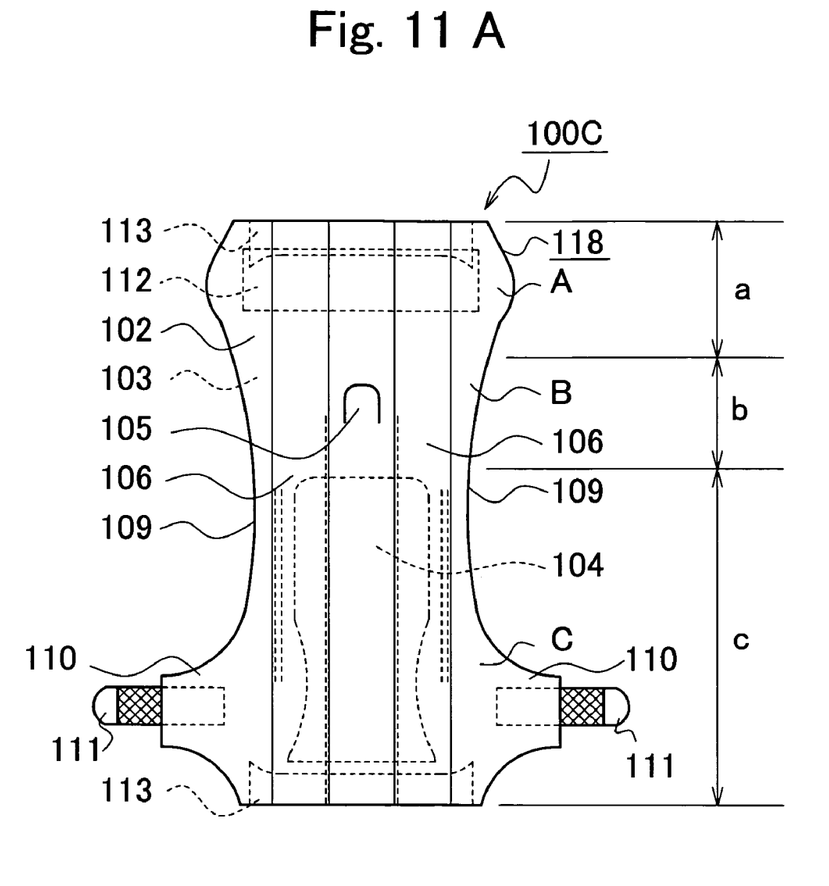
Figure 12:
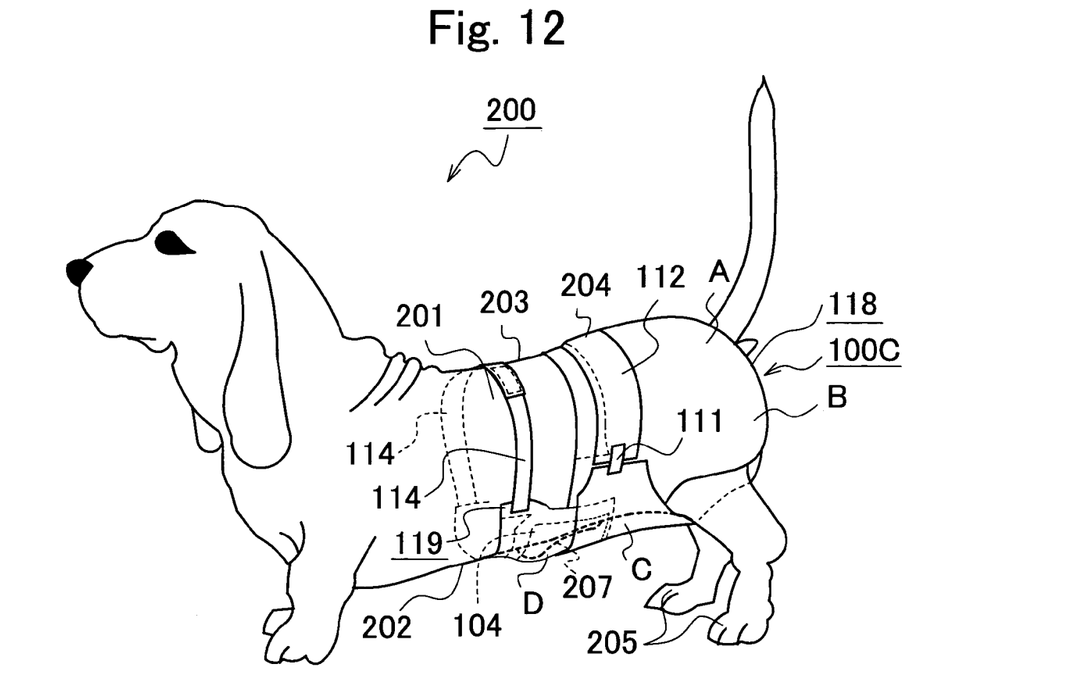
FIG. 12 is an explanatory view of the constitution of an example of use in a state that the diaper for a male pet of the fourth embodiment is used.

FIGS. 11A and 11B are explanatory views of the constitution showing a fourth embodiment of the diaper for a male pet according to the present invention and are also plan views showing a state in which a surface side (a body surface side) of this embodiment is unfolded. FIG. 11A is a view showing the diaper body and FIG. 11B shows a urine capture body which constitutes a separate body. Further, FIG. 12 is an explanatory view of the constitution of a use example in a state that the diaper for a male pet of the fourth embodiment is used. Here, in this drawing, to facilitate the understanding of the invention, the sizes are suitably changed.

The diaper 100C for a male pet of the fourth embodiment is characterized in that the urine capture region D of the belly pad portion C is arranged at a position separated from the diaper body 101, in the diaper 100 for a male pet of the first embodiment. In this embodiment, the urine capture member 119 constitutes a independent body separated from the diaper body 101. That is, the diaper 100C for a male pet includes a diaper body 118 which is shown in FIG. 11A and has a back pad portion A which is brought into contact with the vicinity of a back of a male dog, a crotch pad portion B which is brought into contact with the vicinity of a crotch of the male dog, and a belly pad portion C which is brought into contact with the vicinity of the belly of the male dog, and a urine capture member 119 which is shown in FIG. 11B and is provided with a urine capture region D for capturing urine. On the diaper body 118, a urine absorbing body 104 is formed ranging from crotch pad portion B which is arranged closer to the belly pad portion C than a tail passing hole 105 to the vicinity of fixing tapes 111 formed on both sides of the belly pad portion C. However, the diaper 100C for a male pet is configured such that the lengths of the diaper body 118 and the urine absorbing body 104 are short compared to the diaper 100 for a male pet of the first embodiment and the diaper 100C for a male pet has no urine capture region which extends to the side opposite to the crotch pad portion B from the fixing tapes 111. The urine capture member 119 is constituted of a top sheet 102, a back sheet 103 and the urine absorbing body 104 disposed between the top sheet 102 and the back sheet 103 and a pair of sustaining members 114 are formed on side peripheries of the urine absorbing body 104 in the widthwise direction as the holding structure. The sustaining members 114 are formed such that they have one ends thereof fixed to a surface of the back sheet 103 and another ends thereof extended outwardly in the widthwise direction (the right direction and the left direction in FIG. 11). It is preferable that the urine capture member 119 has, for example, an approximately rectangular shape and a length thereof is a length which can at least cover a distance ranging from a head portion side distal end of the belly pad portion C of the diaper body 118 to a urethral opening 207 and the vicinity thereof when the diaper 100C for a male pet is fitted on the male dog 200. That is, it is preferable that the urine capture member 119 is set to a length which allows the urine capture member 119 to be overlapped to the belly pad portion C of the diaper body 118 with a given size and to cover the urethral opening 207 and the vicinity thereof when the diaper 100C for a male pet is fitted on the male dog 200. Due to such a constitution, as shown in FIG. 12, it is possible to fit the diaper 100C for a male pet such that the side periphery of the urine capture member 119 where the sustaining members 114 are not formed is overlapped to the diaper body 118 and hence, it is possible to prevent the leaking of urine from the joining portion of the diaper body 118 and the urine capture member 119.

Further, although not shown in the drawing, as the urine capture member 119, the rigid member 117 may be arranged below (the back sheet 103 side) the urine absorbing body 104 of the urine capture member 119 as shown in the third embodiment.

Hereinafter, a specific example of manner of using the diaper 100C for a male pet of the fourth embodiment according to the present invention is explained in detail.

As explained in conjunction with the diaper 100 for a male pet of the first embodiment, first of all, the owner holds the diaper body 118 of the diaper 100C for a male pet shown in FIG. 11 and allows the tail 206 of the male dog 200 shown in FIG. 12 to pass through the tail passing hole 105. Next, the back pad portion A of the diaper body 118 shown in FIG. 11A is brought into contact with the back 203 of the male dog 200 shown in FIG. 12. Thereafter, the crotch pad portion B of the diaper body 118 shown in FIG. 11 is brought into contact with the crotch or the like of the male dog 200 shown in FIG. 12 such that a pair of curved notch portions 109 of the diaper body 118 shown in FIGS. 11A and 11B are respectively brought into contact with thigh portions of a pair of hind legs 205 of the male dog 200 shown in FIG. 12. Next, the belly pad portion C of the diaper body 118 shown in FIG. 11 is brought into contact with the belly 202 of the male dog 200 shown in FIG. 12 and, thereafter, a pair of fixing tapes 111 which are fixed to the diaper body 118 shown in FIG. 11 are fastened to the mounting portions 112 which are fixed to a surface of the back sheet 103 of the back pad portion a of the diaper body 118 thus fixing the diaper body 118. Here, the side periphery of the urine capture member 119 (the upper side periphery in FIG. 11) shown in FIG. 11B where the sustaining members 114 are not formed is overlapped to the diaper body 118 and is arranged at a position where the urine capture member 119 is fixed by the fixing tapes 111. Due to such a constitution, the urine capture member 119 is fixed by the pair of fixing tapes 111 in a state that one end of the urine capture member 119 is overlapped to the diaper body 118. Next, using the sustaining members 114 formed on the urine capture member 119, the diaper 100C for a male pet is engaged with the trunk 201 of the male dog 200 in the same manner as the second embodiment.

In this manner, the diaper 100C for a male pet of the third embodiment is fitted, as shown in FIG. 12, on the baby dog whose age is only a few months or so after he was born or the male dog which requires the owner's help to evacuate the bowels due to aging or an accident. Further, the removal of the diaper 100C for a male pet from the male dog 200 is conducted in accordance with steps opposite to the above-mentioned fitting operation.

Figure 13:
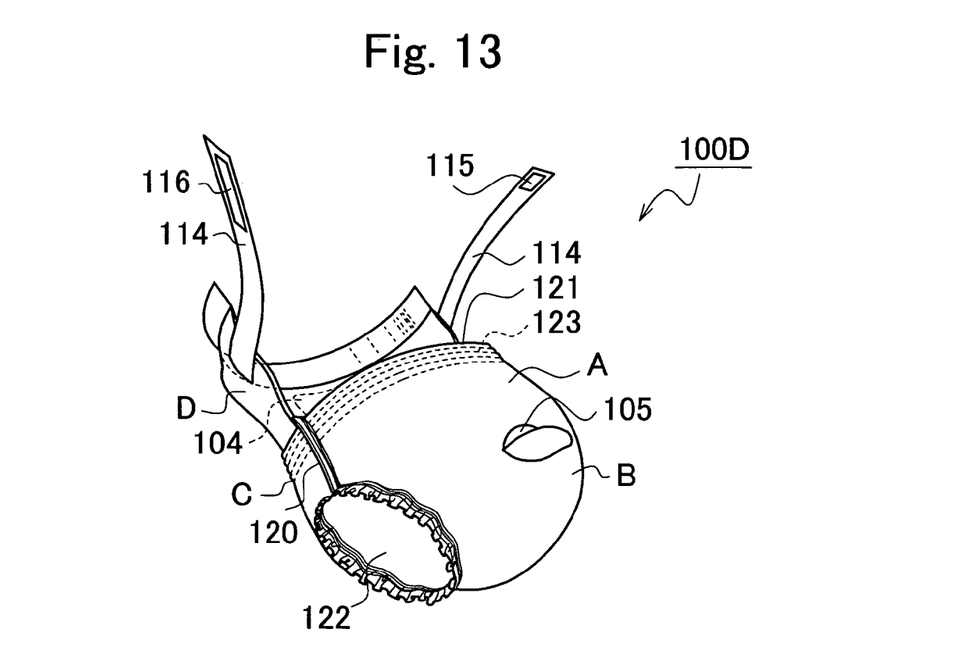
FIG. 13 is a perspective view showing the fifth embodiment of the diaper for a male pet according to the present invention.

Next, a fifth embodiment of the diaper for a male pet according to the present invention is explained in conjunction with FIG. 13.

FIG. 13 is a perspective view showing the fifth embodiment of the diaper for a male pet according to the present invention and the diaper 100D for a male pet of the present invention is a panty-type diaper for a male pet. The panty-type diaper 100D for a male pet is formed as follows. That is, the widthwise-directional end periphery of the back pad portion A and the widthwise-directional end periphery of the belly pad portion C of the open type diaper 100A for a male pet of the second embodiment shown in FIG. 5 are joined with each other thus forming joining portions 120 on both sides of the diaper 100D for a male pet. Accordingly, the back pad portion A and the belly pad portion C are contiguously formed to form a girth portion 121 thus providing the panty-type diaper 100D for a male pet. Further, by joining the width-wise directional side peripheries of the back pad portion A and the belly pad portion C of the open type diaper 100A for a male pet with each other, the pair of curved notch portions 109 of the diaper body 101 shown in FIG. 5 are formed into a pair of opening portions 122 around legs which allows the legs of the pet to pass therethrough. Then, on the crotch pad portion B of the panty-type diaper 100D for a male pet, tail passing holes 105 for allowing the tail 206 to pass therethrough are formed as slits 105a in the vicinity of the back pad portion A side. To the side peripheral portion of the back pad portion A and the side peripheral portion of the belly pad portion C of the panty-type diaper 100D for a male pet, elastic bodies 123 for imparting the expansion and contraction property is provided along the side peripheries. Due to these elastic bodies 123, when the panty-type diaper 100D for a male pet is fitted on the male pet, the girth portion 121 is brought into close contact with the body of the pet.

Further, on the diaper 100D for a male pet, the urine capture region D which extends toward the head portion side from the joining portion 120 of the belly pad portion C (in the oblique upper direction in FIG. 13) is formed. On the side periphery in the widthwise direction of the head portion side end portion of the urine capture region D, a pair of the engaging members 114 are formed as the holding structure for holding the urine capture region d in the same manner as the diaper 100A for a male pet of the second embodiment.

Here, as parts for holding the urine capture region D, the rigid member 117 may be formed below the urine absorbing body 104 in the same manner as the diaper 10B for a male pet of the third embodiment (see FIG. 7).

Hereinafter, a specific example of manner of using the diaper 100D for a male pet of the fifth embodiment according to the present invention shown in FIG. 13 is explained in detail with reference to FIG. 6. First of all, the owner holds the diaper 100D for a male pet shown in FIG. 13 and allows left and right hind legs 205 of the male dog 200 shown in FIG. 6 to pass through the pair of the opening portions 122 around legs and, thereafter, the diaper 100D for a male pet is pulled up to thigh portions of the left and right hind legs 205 of the male dog 200. Next, the owner allows the tail 206 of the male dog 200 to pass through the tail passing hole 105 of the diaper 100D for a male pet. Next, the girth portion 121 of the diaper 100D for a male pet is pulled up so as to bring the girth portion 121 into close contact with the back 203 and the belly 202 of the male dog 200 shown in FIG. 6. Next, the sustaining members 114 formed on the urine capture region d are wrapped around the trunk 201 of the male dog 200 so as to engage the diaper 100D for a male pet with the male dog 200 in the same manner as the second embodiment.

In this manner, the diaper 100D for a male pet of the fifth embodiment is fitted on the baby dog whose age is only a few months or so after he was born or the male dog 200 which requires the owner's help to evacuate the bowels due to aging or an accident. Further, the removal of the panty-type diaper 100D for a male pet from the male dog 200 is conducted in accordance with steps opposite to the above-mentioned fitting operation.

Although the case in which the diaper 100A for a male pet shown in FIG. 5 is formed into the panty-type diaper 100D for a male pet has been explained above, the diaper 100 for a male pet shown in FIG. 1 or the diaper 100B for a male pet shown in FIG. 7 may be formed into the panty-type diaper 100D for a male pet.

As described above, the diapers for a male pet according to the present invention have been specifically explained in conjunction with drawings which illustrate example. However, it is needless to say that the present invention is not limited to the examples illustrated in the drawing and the proper modifications may be made in exercising the present invention within a range in which the modifications conform with the above-mentioned gist of the present invention and these modifications also included in the technical scope of the present invention.

For example, the engagement of the fixing tapes may adopt the mechanical engagement in which a hook member is used as the male-side engaging member and the corresponding female-side engaging member may be formed of loop fibers having a nonwoven fabric surface without requiring the adhesion portions 112 particularly. Further, the tail passing hole which allows the tail of the pet to pass therethrough may be formed of a cut-out hole in place of the slit.

What is claimed is:

1. A diaper for a male pet which is put on a male pet and includes a diaper body having a back pad portion which is brought into contact with the vicinity of the back of the male pet, a crotch pad portion which is brought into contact with the vicinity of the crotch of the male pet, and a belly pad portion which is brought into contact with the vicinity of the belly of the male pet, wherein the diaper for a male pet further includes a urine capture member which has a urine capture region which is arranged at a position and is set to a size to allow to cover a urethral opening of the male pet and the vicinity of the urethral opening when the diaper for a male pet is put on the male pet and includes a urine absorbing body which absorbs urine; and a holding structure which holds the diaper such that the urine capture region is brought into contact with the belly of the male pet even after the urine absorbing body absorbs urine; said holding structure comprising:
a planar rigid member formed on a back surface of the urine absorbing body of the urine capture region, wherein the rigid member supports the urine capture region in the head and side surface direction.

2. The diaper for a male according to claim 1, wherein the diaper body further includes a tail passing hole which allows a tail to pass therethrough at a position which corresponds to the tail of the male pet when the crotch portion is fitted to the crotch of the male pet;
the urine absorbing body and fixing tapes which are provided at a position corresponding to a waist portion of the male pet when the diaper put on the male pet and extend outwardly from both side peripheries of the diaper body are mounted on the belly pad portion; and
the urine capture region extends in the direction opposite to the crotch portion from the position where the fixing tapes are formed.

3. The diaper for a male pet according to claim 2, wherein the urine capture region extends toward the head of the male pet from the position where the fixing tapes are formed.

4. The diaper for a male pet according to claim 2, wherein the fixing tapes are fastened to the diaper body by heat sealing.

5. The diaper for a male pet according to claim 2, wherein the fixing tapes are fastened to the diaper body by the mechanical engagement.

6. The diaper for a male pet according to claim 2, wherein the fixing tapes are fastened to the diaper body using an adhesive material.

7. The diaper for a male pet according to claim 1, wherein a bending resistance of the urine absorbing body according to the cantilever method of JIS in the head direction and in the side surface direction is 40 mm to 150 mm.

8. The diaper for a male pet according to claim 1, wherein the diaper for a male pet is an open-type diaper.

9. The diaper for a male pet which is put on a male pet and includes a diaper body having a back pad portion which is brought into contact with the vicinity of the back of the male pet, and a belly pad portion which is brought into contact with the vicinity of the belly of the male pet, wherein the diaper for a male pet further includes a urine capture member which has a urine capture region which is arranged at a position and is set to a size to allow covering of a urethral opening of the male pet and the vicinity of the urethral opening when the diaper for a male pet is put on the male pet and includes a urine absorbing body which absorbs urine;

a first holding structure which holds the diaper such that the urine capture region is brought into contact with the belly of the male pet even after the urine absorbing body absorbs urine;

a second holding structure, having strip-like sustaining members, which holds the diaper such that the urine capture region is held approximately, the strip-like sustaining members being formed on side peripheries of the urine capture region, the second holding structure forming a ring around the trunk of the male pet; and  a tail passing hole provided on the diaper body, which allows a tail to pass therethrough at a position which is formed as a slit corresponding to the position of the tail of the male pet when the crotch portion is fitted to the crotch of the male pet;

said first holding structure comprising a planar rigid member formed on a back surface of the urine absorbing body of the urine capture region, wherein the rigid member supports the urine capture region in the head and side surface direction.

10. The diaper for a male pet according to claim 9, wherein the sustaining members are respectively formed on both side peripheries of the uripe capture region, one end portions of each of the sustaining members are fixed to one side peripheries of the urine capture region and another end portions of each of the sustaining members are formed in an extending manner to the outside whereby one end portions and another end portions are engaged with each other on the trunk of the male pet when the diaper put on.

11. The diaper for a male pet according to claim 9, wherein the sustaining members are formed on one side peripheries of the urine capture region, and when the diaper is put on the male pet, one of the sustaining members makes a circuit of the trunk and is engaged with another side periphery sides of the urine capture region.

12. The diaper for a male pet according to claim 9, wherein an anti-slip function is imparted to a side of the sustaining members which is brought into contact with the male pet.

13. The diaper for a male pet according to claim 9, wherein the urine capture region is held in a suspending manner by the sustaining member which has one end fixed to the urine capture region and makes a circuit of the trunk the male pet.

14. The diaper for a male pet according to claim 9, wherein a bending resistance of the rigid member according to the cantilever method of Japanese Industrial Standard in the head direction and in the side surface direction respectively is 40 mm to 190 mm.

15. The diaper for a male pet according to claim 9 wherein the urine capture region is formed separately from the diaper body.

16. The diaper for a male pet according to claim 1, wherein the diaper for a male pet is a panty-type diaper.

* * * * *